(12) United States Patent
Beattie, Jr.

(10) Patent No.: US 10,820,249 B2
(45) Date of Patent: *Oct. 27, 2020

(54) METHOD AND APPARATUS FOR DISTRIBUTING CONTENT VIA DIVERSE NETWORKS

(71) Applicant: AT&T Intellectual Property I, L.P., Atlanta, GA (US)

(72) Inventor: James G. Beattie, Jr., Bergenfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,100

(22) Filed: Jan. 4, 2019

(65) Prior Publication Data

US 2019/0141601 A1 May 9, 2019

Related U.S. Application Data

(63) Continuation of application No. 15/170,711, filed on Jun. 1, 2016, now Pat. No. 10,182,387.

(51) Int. Cl.
*H04W 40/18* (2009.01)
*H04W 48/00* (2009.01)
(Continued)

(52) U.S. Cl.
CPC .......... *H04W 40/18* (2013.01); *H04W 24/02* (2013.01); *H04W 28/00* (2013.01); *H04W 48/00* (2013.01);
(Continued)

(58) Field of Classification Search
CPC ..... H04W 24/02; H04W 28/00; H04W 40/18; H04W 48/00; H04W 40/02–22;
(Continued)

(56) References Cited

U.S. PATENT DOCUMENTS

| 5,291,554 A | 3/1994 | Morales |
| 5,740,246 A * | 4/1998 | Saito .................. G06Q 20/02 |
| | | 348/E7.056 |

(Continued)

FOREIGN PATENT DOCUMENTS

| CA | 2514585 C | 5/2013 |
| DE | 102006047308 A1 | 4/2008 |

OTHER PUBLICATIONS

Frossard, Pascal et al., "Media streaming with network diversity", Proceedings of the IEEE 96.1 (2008): 39-53., 2008.

(Continued)

*Primary Examiner* — Dung B Huynh
(74) *Attorney, Agent, or Firm* — Guntin & Gust, PLC; Dana B. Lemoine

(57) ABSTRACT

Aspects of the subject disclosure may include, for example, selecting a first pathway of available pathways during a first time period according to predicted opportunities for a mobile communication device to access a first network via the available pathways, and directing transmission of first data to the mobile communication device via the first pathway during the first time period, wherein a presence of a second data at the mobile communication device enables an application to access the first data at the mobile communication device. Other embodiments are disclosed.

20 Claims, 7 Drawing Sheets

(51) Int. Cl.
  *H04W 28/00* (2009.01)
  *H04W 24/02* (2009.01)
  *H04N 21/4405* (2011.01)
  *G06F 21/62* (2013.01)
  *G06F 21/10* (2013.01)

(52) U.S. Cl.
  CPC .............. *G06F 21/10* (2013.01); *G06F 21/62* (2013.01); *H04N 21/4405* (2013.01)

(58) Field of Classification Search
  CPC .. H04W 12/08; H04W 12/0804; H04B 13/00; G06F 21/10; G06F 21/62; G06F 21/6209; H04L 2463/101; H04L 63/10; H04N 21/4126; H04N 21/41407; H04N 21/4627; H04N 21/8355; H04N 21/2541; H04N 21/4405; H04N 21/2347; H04N 21/26613; H04N 21/437; H04N 21/4408; H04N 21/47202; H04N 21/6125; H04N 21/6175; H04N 21/835; H04N 7/17309; H04N 7/165; H04N 7/1675; H04N 7/17318
  See application file for complete search history.

(56) References Cited

U.S. PATENT DOCUMENTS

| | | | |
|---|---|---|---|
| 6,434,592 B1 * | 8/2002 | Cameron | H04L 29/06 709/232 |
| 6,993,508 B1 | 1/2006 | Major et al. | |
| 7,277,870 B2 | 10/2007 | Mourad et al. | |
| 7,340,762 B2 | 3/2008 | Kim et al. | |
| 7,655,855 B2 | 2/2010 | Damevski et al. | |
| 8,153,878 B2 | 4/2012 | Chevreau et al. | |
| 8,229,856 B1 | 7/2012 | Reddick et al. | |
| 8,247,676 B2 | 8/2012 | Georges et al. | |
| 8,402,497 B2 | 3/2013 | Chang et al. | |
| 8,429,701 B2 | 4/2013 | Li et al. | |
| 8,677,152 B2 | 3/2014 | Kahn et al. | |
| 8,776,216 B2 | 7/2014 | Boccon-Gibod et al. | |
| 8,799,483 B2 | 8/2014 | Van et al. | |
| 8,818,902 B2 | 8/2014 | Schiesser et al. | |
| 8,875,196 B2 | 10/2014 | Zaslavsky et al. | |
| 8,886,166 B2 * | 11/2014 | Fratti | H04W 12/10 455/411 |
| 8,892,081 B2 | 11/2014 | Lee et al. | |
| 8,909,925 B2 | 12/2014 | Baskaran | |
| 8,953,565 B1 * | 2/2015 | Schlesener | H04W 4/80 370/338 |
| 8,959,563 B2 | 2/2015 | Santangelo et al. | |
| 9,237,638 B2 | 1/2016 | Davis et al. | |
| 9,244,916 B2 | 1/2016 | Berger et al. | |
| 9,247,494 B2 | 1/2016 | Fang et al. | |
| 9,268,920 B1 | 2/2016 | Thiagarajan et al. | |
| 9,668,298 B1 * | 5/2017 | Pearl | H04W 88/005 |
| 9,826,060 B1 * | 11/2017 | Johansson | H04L 67/327 |
| 10,313,725 B2 * | 6/2019 | Farrugia | H04N 7/165 |
| 10,334,647 B2 * | 6/2019 | Matsushita | H04L 12/46 |
| 2001/0009857 A1 | 7/2001 | Vanttinen | |
| 2002/0023010 A1 | 2/2002 | Rittmaster et al. | |
| 2002/0035690 A1 * | 3/2002 | Nakano | H04L 9/0822 713/171 |
| 2002/0078361 A1 | 6/2002 | Giroux et al. | |
| 2002/0106086 A1 * | 8/2002 | Kamiya | H04N 7/17345 380/277 |
| 2002/0136407 A1 | 9/2002 | Denning et al. | |
| 2002/0188955 A1 | 12/2002 | Thompson et al. | |
| 2003/0097477 A1 * | 5/2003 | Vossler | H04W 28/06 709/248 |
| 2003/0099221 A1 * | 5/2003 | Rhee | H04W 52/0232 370/338 |
| 2003/0148778 A1 * | 8/2003 | Burdue | H04W 88/04 455/517 |
| 2003/0225835 A1 * | 12/2003 | Klien | H04L 12/1877 709/205 |
| 2004/0123097 A1 * | 6/2004 | Ranjan | G11B 20/00086 713/153 |
| 2004/0143652 A1 * | 7/2004 | Grannan | H04L 67/14 709/223 |
| 2004/0193902 A1 | 9/2004 | Vogler et al. | |
| 2005/0013440 A1 * | 1/2005 | Akiyama | H04N 7/1675 380/277 |
| 2005/0132411 A1 | 6/2005 | Otsuka et al. | |
| 2005/0177823 A1 | 8/2005 | Miyake et al. | |
| 2005/0190717 A1 * | 9/2005 | Shu | H04L 45/00 370/328 |
| 2005/0216752 A1 * | 9/2005 | Hofmeyr | H04N 21/835 713/189 |
| 2006/0074550 A1 | 4/2006 | Freer et al. | |
| 2006/0203804 A1 * | 9/2006 | Whitmore | H04L 45/00 370/352 |
| 2006/0229992 A1 * | 10/2006 | Morten | H04L 9/083 705/50 |
| 2006/0235883 A1 | 10/2006 | Krebs et al. | |
| 2007/0011589 A1 * | 1/2007 | Palanki | H04L 1/1607 714/780 |
| 2007/0028233 A1 * | 2/2007 | Miller | G06F 21/10 717/174 |
| 2007/0055544 A1 | 3/2007 | Jung et al. | |
| 2007/0086372 A1 * | 4/2007 | Lee | H04N 21/8355 370/328 |
| 2007/0086427 A1 * | 4/2007 | Cohen | H04W 40/18 370/351 |
| 2007/0093239 A1 * | 4/2007 | Camp, Jr. | H04N 21/4181 455/418 |
| 2007/0098162 A1 * | 5/2007 | Shin | H04N 21/2541 380/201 |
| 2007/0106804 A1 * | 5/2007 | Bosschaert | G06Q 10/109 709/229 |
| 2007/0199040 A1 | 8/2007 | Kates et al. | |
| 2007/0208946 A1 * | 9/2007 | Baby | H04L 67/2819 713/182 |
| 2007/0220271 A1 * | 9/2007 | Law | H04L 63/08 713/185 |
| 2007/0249291 A1 | 10/2007 | Nanda et al. | |
| 2008/0130899 A1 * | 6/2008 | Iwamoto | H04L 63/08 380/278 |
| 2008/0162937 A1 * | 7/2008 | Kohlenberg | H04L 9/0838 713/171 |
| 2009/0064266 A1 * | 3/2009 | Wollmershauser | H04N 21/2541 725/134 |
| 2009/0138974 A1 | 5/2009 | Perdomo et al. | |
| 2009/0175219 A1 * | 7/2009 | Chaintreau | H04L 47/564 370/328 |
| 2009/0177303 A1 | 7/2009 | Logan et al. | |
| 2009/0182670 A1 | 7/2009 | Farrugia et al. | |
| 2009/0187670 A1 * | 7/2009 | Lee | H04W 76/30 709/231 |
| 2009/0276815 A1 * | 11/2009 | Casagrande | H04N 21/2402 725/87 |
| 2009/0310936 A1 | 12/2009 | Lebegue et al. | |
| 2010/0027418 A1 * | 2/2010 | Rodrig | H04L 41/147 370/235 |
| 2010/0027562 A1 * | 2/2010 | Carpio | H04W 28/065 370/474 |
| 2010/0257279 A1 * | 10/2010 | Chiang | H04L 67/04 709/231 |
| 2010/0293246 A1 | 11/2010 | Urazoe et al. | |
| 2011/0066861 A1 | 3/2011 | Klum et al. | |
| 2011/0124284 A1 * | 5/2011 | Adam | H04W 40/22 455/7 |
| 2011/0153785 A1 * | 6/2011 | Minborg | G06F 16/437 709/219 |
| 2011/0162045 A1 * | 6/2011 | Okuyama | H04L 63/105 726/3 |
| 2011/0191484 A1 | 8/2011 | Babbar et al. | |
| 2011/0199915 A1 * | 8/2011 | Santhanam | H04W 36/0011 370/252 |

(56) References Cited

U.S. PATENT DOCUMENTS

| | | | |
|---|---|---|---|
| 2011/0213986 A1* | 9/2011 | Kanee | G06F 21/14 |
| | | | 713/187 |
| 2012/0102317 A1 | 4/2012 | Mathur et al. | |
| 2012/0163603 A1* | 6/2012 | Abe | H04W 12/1206 |
| | | | 380/278 |
| 2012/0167189 A1 | 6/2012 | Aichroth et al. | |
| 2012/0190339 A1* | 7/2012 | Abe | H04W 48/16 |
| | | | 455/411 |
| 2013/0145057 A1* | 6/2013 | Rathi | G06F 13/4286 |
| | | | 710/38 |
| 2013/0173778 A1* | 7/2013 | Hsy | H04L 43/14 |
| | | | 709/224 |
| 2013/0217332 A1* | 8/2013 | Altman | H04W 12/04 |
| | | | 455/41.2 |
| 2013/0254519 A1* | 9/2013 | Benoit | G06F 11/3051 |
| | | | 713/1 |
| 2013/0294358 A1* | 11/2013 | Kim | H04W 72/12 |
| | | | 370/329 |
| 2014/0013420 A1 | 1/2014 | Picionielli et al. | |
| 2014/0229309 A1 | 8/2014 | Talreja et al. | |
| 2014/0230000 A1 | 8/2014 | Kotecha et al. | |
| 2014/0299660 A1* | 10/2014 | Melzer | G06K 9/00087 |
| | | | 235/375 |
| 2015/0038159 A1* | 2/2015 | Fang | H04W 48/20 |
| | | | 455/452.2 |
| 2015/0055544 A1 | 2/2015 | Lee et al. | |
| 2015/0156781 A1* | 6/2015 | Dahlman | H04W 72/0406 |
| | | | 370/329 |
| 2015/0326899 A1 | 11/2015 | Setos | |
| 2016/0014818 A1* | 1/2016 | Reitsma | H04W 76/50 |
| | | | 370/254 |
| 2016/0021607 A1* | 1/2016 | Conant | H04W 4/60 |
| | | | 370/254 |
| 2016/0198343 A1* | 7/2016 | Heo | H04L 5/0051 |
| | | | 380/270 |
| 2016/0345132 A1 | 11/2016 | Creighton et al. | |
| 2016/0359815 A1* | 12/2016 | Gaushell | H04L 63/0428 |
| 2016/0359874 A1* | 12/2016 | Black | H04W 12/0609 |
| 2016/0381107 A1 | 12/2016 | Morgan et al. | |
| 2017/0317824 A1 | 11/2017 | Brown | |
| 2017/0353907 A1 | 12/2017 | Beattie, Jr. | |
| 2017/0359719 A1* | 12/2017 | Li | H01M 10/42 |
| 2018/0102964 A1* | 4/2018 | Kao | H04L 67/2842 |
| 2018/0232735 A1* | 8/2018 | Palacio | G06Q 20/401 |

OTHER PUBLICATIONS

Geambasu, Roxana et al., "Keypad: an auditing file system for theft-prone devices.", Proceedings of the sixth conference on Computer systems. ACM, 2011. http://128.59.11.206/~roxana/teaching/CloudMobileS13/papers/geambasueurosys11.pdf, 2011.

Ravenscraft, Eric, "Steam Now Allows You to Preload Games to Any Folder", Lifehacker, lifehacker.com, Jun. 3, 2014. http://lifehacker.com/steam-now-allows-you-to-preload-games-to-any-folder-1585446211, 2014.

Reddy, Dattatray et al., "Providing Security to Mobile Video Streaming and Video Sharing in the Cloud.", International Journal of Computer Applications 118.22 (2015)., 2015.

Veeraraghavan, Kaushik et al., "Cobalt: Separating Content Distribution from Authorization in Distributed File Systems", FAST. vol. 7. 2007. https://www.usenix.org/legacy/event/fast07/tech/full_papers/veeraraghavan/veeraraghavan_html/ Discloses a distributed, 2007.

* cited by examiner

100

200

METHOD AND APPARATUS FOR DISTRIBUTING CONTENT VIA DIVERSE NETWORKS

CROSS-REFERENCE TO RELATED APPLICATIONS

This application is a continuation of U.S. patent application Ser. No. 15/170,711 filed Jun. 1, 2016. The contents of each of the foregoing are hereby incorporated by reference into this application as if set forth herein in full.

FIELD OF THE DISCLOSURE

The subject disclosure relates to a method and apparatus for distributing content via diverse networks.

BACKGROUND

Content, including media content, is typically experienced by consumers via devices such as computers, televisions, radios, and mobile electronics. Media content can be delivered by service providers, who send the content, such as television, radio, and video programming, to consumers for enjoyment at their physical locations. Modern communications networks benefit from interconnectivity between consumers and various communication devices. As network capabilities expand, these interconnections can provide new opportunities to enhance the ability for consumers to enjoy content by experiencing a variety of content over multiple devices. Intelligent devices offer means for the enjoyment of content in ways that anticipate consumer personalization of media content presentation.

BRIEF DESCRIPTION OF THE DRAWINGS

Reference will now be made to the accompanying drawings, which are not necessarily drawn to scale, and wherein.

DETAILED DESCRIPTION

Figure 1:
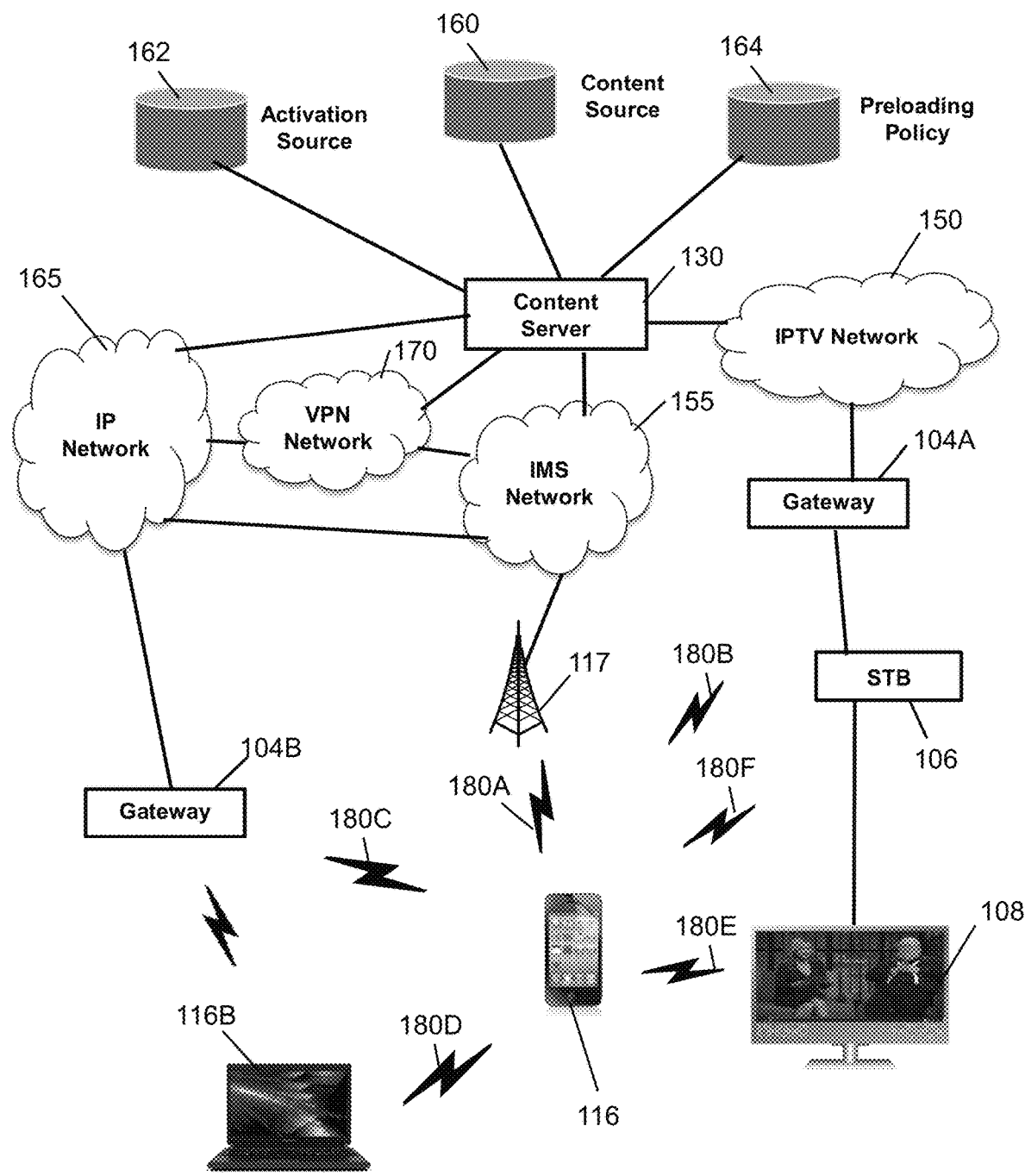
FIG. 1 depicts an illustrative embodiment of a system that can be utilized for providing embargoed content.

The subject disclosure describes, among other things, illustrative embodiments for distribution of content to devices via networks. Devices, such as mobile communication devices, can access data via multiple networks and/or network access points. Over the course of time, a variable set of network access points may be available for access by any given device. Each of these network access points may exhibits characteristics, such as available bandwidth and cost for access to data, and these characteristics may change over time. The available network access points that are available to the devices can be monitored to determine when the devices can potentially download content via the access points and to select an available access path to use for download based on the access point characteristics. It may further be desirable to provide access to content to a large number of devices at the same time, such as when media content or software upgrade is released. At the planned time for release, a device may not have network access (or access of sufficient quality) to ensure good download performance. To overcome this problem, content can be preloaded into the device in advance of the time of release to avoid network-induced quality issues. By monitoring access points that are available to a device in advance of the release and then selecting a network access point and time for download, the content can be properly loaded into the device before it is needed. Release data can also be loaded into the device to regulate access to the content by the device. For example, the release data can be used embargo the preloaded content from access and use by the device until the release time and/or to enable use of the preloaded content by the device at the planned time of release. Other embodiments are described in the subject disclosure.

One or more aspects of the subject disclosure include a device that can include a processing system including a processor and a memory that stores executable instructions that, when executed by the processor, facilitate performance of operations, including identifying available pathways for a mobile communication device to access a network, and monitoring communications between the mobile communication device and the network via the available pathways to generate a history of network connectivity associated with the mobile communication device. The processing system can also perform operations for predicting opportunities for the mobile communication device to access the network via the available pathways during a first time period according to the history of network connectivity. The processing system can further perform operations for selecting a first pathway of the available pathways according to the opportunities that are predicted for the mobile communication device to access the network via the available pathways during the first time period. The processing system can perform operations for directing transmission of first data to the mobile communication device via the first pathway during the first time period. The processing system can also perform operations for directing transmission of second data to the mobile communication device. A presence of the second data at the mobile communication device can enable an application to access the first data at the mobile communication device.

One or more aspects of the subject disclosure include a method including monitoring, by a processing system including a processor, communications between a mobile communication device and a network via available pathways to generate a history of network connectivity associated with the mobile communication device. The method can also include predicting, by the processing system, opportunities for the mobile communication device to access the network via the available pathways during a first time period according to the history of network connectivity. The method can further include selecting, by the processing system, a first pathway of the available pathways according to the opportunities that are predicted for the mobile communication device to access the network via the available pathways during the first time period. The method can include directing, by the processing system, transmission of first data to the mobile communication device via the first pathway during the first time period. A presence of a second data at the mobile communication device can enable an application to access the first data at the mobile communication device.

One or more aspects of the subject disclosure include a machine-readable storage medium, including executable instructions that, when executed by a processing system including a processor, facilitate performance of operations, including predicting opportunities for a mobile communication device to access a network via available pathways during a first time period according to a history of network connectivity of the mobile communication device. The processing system can also perform operations for selecting a first pathway of the available pathways according to the opportunities that are predicted for the mobile communication device to access the network via the available pathways during the first time period. The processing system can further perform operations for directing transmission of first data to the mobile communication device via the first pathway during the first time period. A presence of a second data at the mobile communication device can enable an application to access the first data at the mobile communication device.

FIG. 1 depicts an illustrative embodiment of a system that can be utilized for providing content to devices. In one embodiment, the system 100 can incorporate a subscription content service. For example, the subscription content service can be part of a cable, satellite, fiber optic, and/or DSL based media content delivery system. The content can be any type of content, such as broadcast television, cable or premium television, video on demand, or pay-per-per view television. The content can be software content, including entire software programs, upgrades to programs, and/or additions to programs. Content can be subscription-based, such as basic cable, premium cable, or movie channel content. The content can be non-subscription-based, such as "free" Internet-based content of over-the-air television content and/or single offers or purchases of content. In one embodiment, the system 100 can include one or more content servers 130 that can receive content from one or more content sources 160. Content servers 130 can provide content to one or more delivery networks 150, 155, and 165. For example, a content server 130 can deliver media content services via an internet protocol television (IPTV) network 150, an internet protocol multimedia subsystem network 155, and/or an internet protocol network.

In one embodiment, content can be routed to the IPTV network 150, which, in turn can deliver content to a gateway device 104A. In turn, the gateway device 104A can route content to a media processor device 106, such as a set-top box. In another embodiment, the content server 130 can deliver content by the IMS network 155 to a mobility network 117. The mobility network 117 can route content to a mobile communication device 116, such as a wireless smart phone, via a cellular, long term evolution (LTE), third generation (3G), and/or fourth generation (4G) wireless networks. In one embodiment, the mobile communication device 116B can route content that is received over the mobility network 117 by, for example, a mobile hotspot Wi-Fi link between the mobile communication device 116 and a computer device 116B or a media device 108. In another embodiment, the content server 130 can deliver content over a public IP network 165. In turn, the IP network 165 can deliver content through a gateway device 104B to a mobile communication device 116 and/or wireless communication devices 116B. Devices 116 that receive media content from the IP network 165 can, in turn, transmit the media content to the media device 108 via direct connection, such as a USB port, or via a wireless connection, such as Wi-Fi. In another embodiment, the content server 130 can route content via a virtual private network (VPN) 170.

The system 100 can further include authentication functions to insure that media content is distributed only to verified subscribers of the system 100, the networks 150, 155, 165, and 170, and/or the media content sources 160 according to service plan levels of those subscribers. For example, the system 100 can verify that media processor device 106 is be properly identified and validated for receiving media content over the system 100. For example, one or more authentication servers can be used to verify the subscription status of the media processor device 106. Device identifying information, such as MAC address, IP address, and/or SIM card information, can be transmitted to an authentication server. An authentication server can use this identifying information from the media processor device 106 to inquire at a subscriber database of service plan information for a subscriber who is associated with the device 106. The subscriber database can provide subscription status and service plan information to allow the authentication server to enable delivery of purchased media content to the media processor device 106. In one or more embodiments, the media content can be selected based on a number of techniques and criteria, such as based on user input, user preferences, user profiles, monitored user viewing history, and so forth.

In one embodiment, a gateway device 104A can function as an interface between the IPTV network 155 and the media processor device 106. In one embodiment, the gateway device 104A can provide internet working functions, such as protocol translation, impedance matching, data rate conversion, and/or fault isolation necessary for exchanging data between the IPTV network 150 and the home-based media processor device 106. In one embodiment, a gateway device 104B can provide access to a public IP network 165 of the system 100. The public IP network 165 can facilitate communications to Internet-based applications, websites, and databases, such as Social Media sites and Web Databases. This connectivity can allow devices 116 and servers 130 in the system 100 to access and be accessed by the various Internet-based applications, websites, and/or databases.

In one or more embodiments, a device 116, such as a mobile communication device 116, can receive content through various network pathways. For example, the device 116 can receive content via wireless communication 180A with a cellular base station 117 of a mobility network 155. The device 116 can also receive content via wireless communication 180B with gateway device 104A coupled to an IPTV network 150 or wireless communication 180C with gateway device 104B coupled to an IP network 165. The device can also receive content via wireless connection 180D with a computer device 116B, wireless connection 180E with media device 108, or wireless connection 180F with media processor device 106. At any given moment, the mobile communication device 116 can receive wireless communication signals from many cellular sources, local area network sources (e.g., WiFi networks), and/or short range sources (e.g., Bluetooth™). During the span of an hour, a day, or longer, the mobile nature of the mobile communication device 116 can greatly multiply the number of potential communication pathways as the mobile communication device 116 travels from a subscriber's home location to various locations for work, school, shopping, entertainment and recreation, travel, and so forth.

In one or more embodiments, the various wireless communication links 180A-F available to the mobile communication device 116 can, likewise, serve as network access points for various networks 150-170 in the communications network 100. For example, the wireless communication link 180A with the cellular base station 117 can serve as an access point for the IMS network 155 and the IP network 165. The mobile communication device 116 can, therefore, download content from the content sever 130 via the IMS network and/or the IP network using the cellular-based communication link 180A. Similarly, the mobile communication device 116 can download content from the content server 130 via the IPTV network 150 and/or the IP network 165 via the gateway devices 104A and 104B.

In one or more embodiments, it can be desirable to for content to be available for use by many devices at the same time. For example, some media content, such as a new movie or video game, may be released for consumption at a single time so that all of its consumers will have the same opportunity to share a common experience with the new content. Similarly, a new upgrade to a software program may be intended for release at a single time not only for the purpose of providing a common time-based experience but also to synchronize a change in software behavior and/or performance of all user devices. In either case, significant barriers can exist in achieving the goal of a single release time. Theoretically, the best way to insure a common, single release time is to electrically transmit the content to each device at the same time. However, in reality, each device operates according to its own set of individual capabilities and network capabilities. That is, one device may have excellent capabilities for rapidly downloading and storing content from a content server 130, while another device may have serious limitations in download speed and storage capability. Similarly, one device may benefit from a very high speed network access point while another device may be limited by a relatively low speed network access point. Further, a device may experience significant variations in its download capabilities and/or network access capabilities over the course of time. For example, a mobile communication device 116 may have excellent download capabilities in one location and limited (or no) capabilities in another location simply due to variations in the network access points as the device 116 is moved between the locations. Likewise, the download capabilities may change due to changes in how the device is being used. For example, a mobile communication device 116 can exhibit excellent download capabilities when it is otherwise in an idling mode, while those capabilities degrade significantly when the device is being used for certain applications.

In one or more embodiments, the content server 130 can identify available pathways for network access for a device. For example, the mobile communication device 116 can have pathways that include wireless communication links 180A-F, as described above. Further, as the mobile communication device 116 is moved from a first location, such a premises of the user of device 116, to other locations, such as the user's vehicle, place of work, school, church, shopping locations, and so forth, the content server 130 can identify additional pathways for network access. In one or more embodiments, the content server 130 can monitor the available pathways 180A-F that have been identified and collect historical data thereon. The historical data can include timing information regarding when the device 116 is connected, or located such that it may be potentially connected, to various pathways 180A-F over time. This historical data can include location information, timing information, device capability information, network access capability information, and/or movement information for the device 116. The historical information for the device can provide a historical "transit vector" for the device 116, which can provide a historical picture of when and where the device 116 is typically present and is typically available and capable of downloading content from the content server 130 via one or more network access pathways.

In one or more embodiments, the content server 130 can use historical information regarding the transit vector of the device 116 to predict future opportunities for network access via the available pathways 180A-F. For example, the content server 130 can observe that a mobile communication device 116 is typically at a user's premises between the hours of 10 pm and 7 am most evenings and that, during these times, the device 116 has available network paths that include a cellular communication link 180A, a WiFi communication link 180C to a gateway device 104B at the premises, and a BlueTooth™ communication link to a media device 108. Further, the mobile communication device 116 can potentially download content via any of these available pathways. However, each pathway has its own set of characteristics that can include speed, costs for the user, effects on performance and/or bandwidth of one or more parts of the network 100 and other devices in the network, efficiency of resource usage, effects on the performance and/or availability of the mobile communications device 116, and so forth. For example, the cellular communication link 180A may be the fastest, exhibit the best quality (e.g., signal-to-noise ratio) of any available access pathway. However, the cellular communication pathway may be the most expensive path for downloading data to the device 116 due to the terms and conditions of a data plan that is associated with a telecommunications contract that has been purchased by the user for the device 116. Alternatively, the WiFi communications pathway 180C may provide an excellent alternative for the user by providing a downloading pathway that does not incur large, potential data costs for the user. Similarly, the network data path that is used for providing data via the gateway device 104B may be under stress for some reason (e.g., maintenance or under sizing of the system architecture) and the additional burden of having the device 116 (or, more likely, the burden of providing content via the IP network 165 for a large number of similarly situated devices 116 via local gateways 104B) may create bottle necks and system performance problems for all or part of the network 100. Accordingly, the content server 130 can use this information to engage in a "smart selection" process for selecting one or more of the available network access pathways 180A-F for use in preloading data into the mobile communication device 116.

In one or more embodiments, the content server 130 can determine a required release date for content. Assuming the content is available to the content server 130 prior to the release date, the content server 130 can preload the content onto devices 116 prior to the release date to ensure that all users have access to the content at the release date in spite of differences in network access capabilities. However, if the content server 130 preloads the content, then it must also ensure that the content is not made available for use at the devices 116 prior to the release date so that the integrity of the release date is not compromised. To maintain the release date, the content server 130 can embargo the content data from use at the device by requiring that second data be available to the device 116 for use in unlocking access to the content data. For example, the content data can be protected via a password or passcode that is only made available to the device at the release date. The content data can be encoded or encrypted using an algorithm which requires can only be decode or decrypted with a decoding or decrypting key, such as a special code or file. The decoding or decrypting step may require the presence of a second device or access to a different network or server for completion. In one embodiment, the content data can include a time-based encryption that can only be decrypted on or after the decryption date. The use of an embargoing function, such as encoding or encryption, allows the content server 130 to distribute the content data to devices 116 in advance of the release date without compromising the data, while also ensuring that every device 116 can have a stored copy of the content data available regardless of local and/or temporal issues with network access. The content data can be relatively large (e.g., many Gigabytes), as in the case of a full length movie presentation or a full blown set of software, and can be preloaded to a device 116 in advance using one or more network access pathways that are available, convenient, efficient, and/or low in cost to the user and/or the content server 130. The second data, such as the decryption key data, can be relatively small (e.g., a kilobytes), and can be transmitted to the device 116 at the time of release.

In one or more embodiments, the content server 130 can evaluate the available network access pathways 180A-F for distributing the content to the device 116 by evaluating the historical transit vector data in light of preloading policies 164 and can thereby select a pathway or multiple pathways for preloading the content prior to the release time. For example, the content server 130 can determine that the best pathway and time for preloading the content onto a mobile communication device 116 is via the BlueTooth™ connection 180D between the mobile communication device 116 and the computing device 116B. That is, the content server 130 can determine that preloading the content data through the IP Network 165, gateway device 104B, and computer device 116B is the best solution for the mobile communication device 116 in light of the historical transit vector data and preloading policies. In this example, the content server 130 may discover that the mobile communication device 116 is typically idle during late night-early morning hours when its user is (presumably) asleep but that the mobile communication device 116 is not in proximity to a local area network (LAN) WiFi to which has a permitted connection during those hours. Further, the mobile communication device 116 operates under a subscription plan that makes the download of several Gigabytes of content data via a cellular wireless communication link 180A a problematic option. However, the content server 130 determines, from the historical transit vector data, that the mobile communication device can access the network via the BlueTooth™ connection 180D between the mobile communication device 116 and the computing device 116B during the late night-early morning hours without incurring data download costs. Therefore, the content server 130 can determine that the BlueTooth™ connection 180D pathway is the best option for preloading data.

In one or more embodiments the content server 130 can access a preloading policy 164 while selecting a pathway for preloading content into the mobile communication device. The preloading policy 164 can provide rules and priorities for use in selecting or rejecting different available pathways. For example, the preloading policy 164 can provide quality of service (QoS) guidelines for when preloading should be used. If there is sufficient network connectivity and bandwidth and download capability for a device 116 to receive the content data at the planned release time without risking a violation of a QoS rule that is provided by the preloading policy 164, then the content server 130 can forgo preloading of content data and simply load the content data into the device 116 at the planned release time. Alternatively, if a release time download would risk a QoS violation, then the content server 130 can proceed with selection of a preloading pathway and timing that will avoid the QoS violation. The content server 130 can thereby use the rules and priorities of the preloading policy 164 to provide good QoS for content at that time of release whether for devices 116 independent of the network access, speed, and downloading capabilities available to the devices 116 at the time of the release.

In one or more embodiments, the preloading policy 164 can prioritize between different types of download pathways to achieve the user QoS with respect to the release of the content while achieving other objectives and/or avoiding other pitfalls. The preloading policy 164 can be biased for selecting available, wired IP LAN connections to offload the preloading from the cellular network. For example, the preloading policy can prioritize a wireless communication link 180C that is supplied via a high speed connection and gateway device 104B with no data limits over a wireless communication link 180A that is supplied via a cellular network base station 117, where data limits and potential costs may apply to the user.

In one or more embodiments, preloading policy can prioritize by which network is used for preloading. For example, a mobile communication device 116 can preload the content from the content server 130 via a pathway 180A using a cellular network 155, a pathway 180C using a public IP network 165, or a pathway 180F using a private, IPTV network. The preloading policy 164 can be biased for selecting the IPTV network, assuming necessary licensing and subscription is in place for the user and/or device 116, since the IPTV network is sized and optimized for the transfer of large content files in timely fashion. In one or more embodiments, the content server 130 can compare information regarding relative loading, latency, and/or bandwidth of different networks 150, 155, and 165. The preloading policy 164 can guide the content server 130 is selecting a network that is fits requirements for loading, latency, and/or bandwidth.

In one or more embodiments the content server 130 can select multiple pathways 180A-F for preloading content into a device 116. For example the content server 130 can determine that a first pathway 180B should be used for preloading the content data to a mobile communication device 116. However, the mobile communication device 116 is not predicted to be connected to the first pathway 180B for a time sufficient for completing the entire preload. The content server 130 can select a different preloading pathway 180A-F that is predicted to have sufficient availability or can select a second pathway 180A with which to complete a preload that will begin using the first pathway 180B.

In one or more embodiments the content server 130 can determine how to download the release data that is used for activating or ending the embargo of the content data that is preloaded into devices 116. In one embodiment, the content server 130 can embargo the content data from use at the device by requiring that the release data be available to the device 116 for use in unlocking access to the content data. For example, the content data can be protected via a password or passcode that is only made available to the device at the release date. The content data can be encoded or encrypted using an algorithm which requires can only be decode or decrypted with a decoding or decrypting key, such as a special code or file. The decoding or decrypting step may require the presence of a second device or access to a different network or server for completion. In one embodiment, the content data can include a time-based encryption that can only be decrypted on or after the decryption date. The use of an embargoing function, such as encoding or encryption, allows the content server 130 to distribute the content data to devices 116 in advance of the release date without compromising the data, while also ensuring that every device 116 can have a stored copy of the content data available regardless of local and/or temporal issues with network access.

In one or more embodiments, the content data can be relatively large, as in the case of a full length movie presentation or a full blown set of software, while the release data, such as the decryption key data, can be relatively small and can be transmitted to the device 116 at the time of release. If the content server 130 is timing the end of the embargo period for the content via the delivery of release data, then the content server 130 will time delivery of the release data to the device 116 to coincide with the release timing. In this embodiment, the content server 130 can sense the network 150-165 and pathway 180A-F that are actively used by the device 116 so that the release data can be downloaded to the device 116 via the current network access path to end the embargo. In another embodiment, the content server 112 send the release data the day of the release of the content data from embargo and can include an embedded time hack to ensure that the content data is held until the actual release time.

In one or more embodiments, the pathway predictions can be based on end-to-end analysis from the content server 130 to the device 116. That is, the sequence of networks 150-165, gateways 104A-B, base stations 117, and pathways 180A-F are included.

Figure 2:
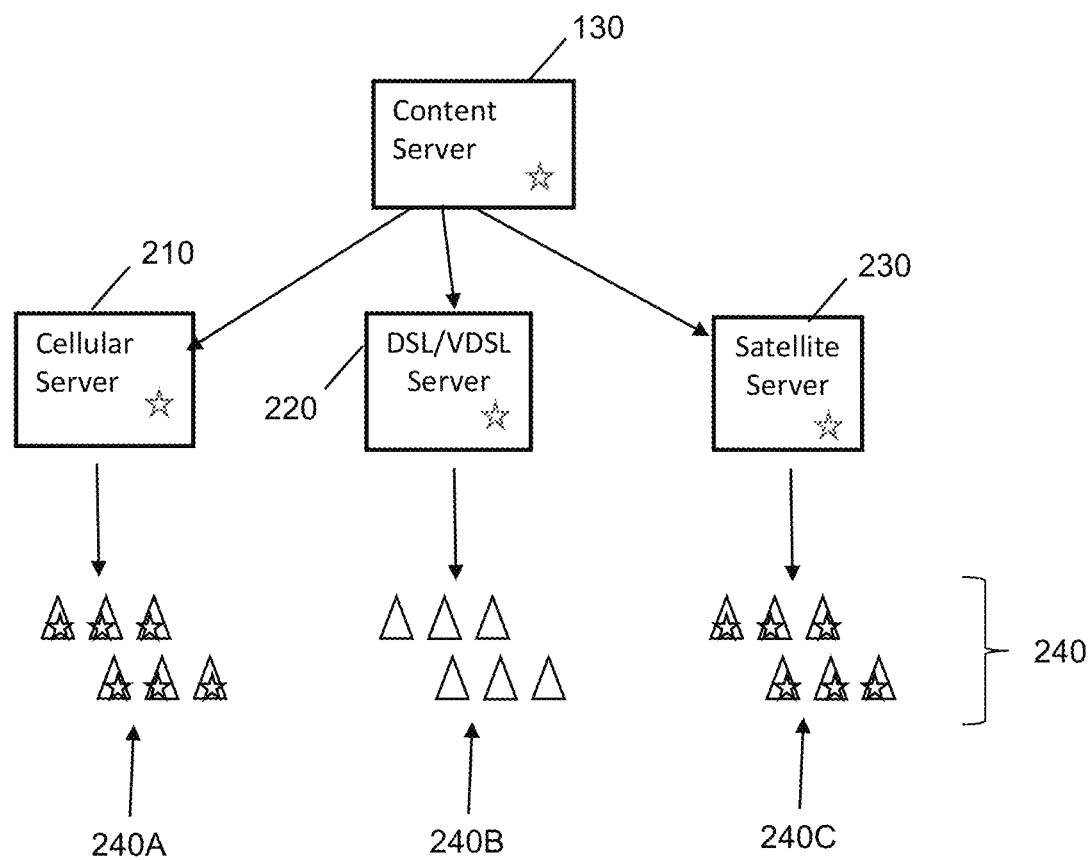
FIG. 2 depicts an illustrative embodiment of the system for providing embargoed content.

FIG. 2 depicts additional illustrative embodiments of a system 200 for providing embargoed content. In one or more embodiments the content server 130 can preload content to the devices 240A and 240C via servers 210 and 230. In one embodiment, the content server 130 can preload content data directly into devices 240A and 240C for embargo until the release data is later downloaded into the devices at the time of release. In one or more embodiment, the content server 140 can alternatively preload the content data into a server 220 but not into the devices 240B. In this case, the content server 130 can determine that the network connectivity and download capability between the server 220 and the devices 240B is of sufficient and predictable quality as to guarantee that the content data will, in fact, arrive at the devices 240 in time for a smooth release of the content at the planned release time. In such a case, the content server 130 may not need to send release data as the content data is effective released when it is sent from the server 220 to the devices 240B at the release time.

Figure 3:
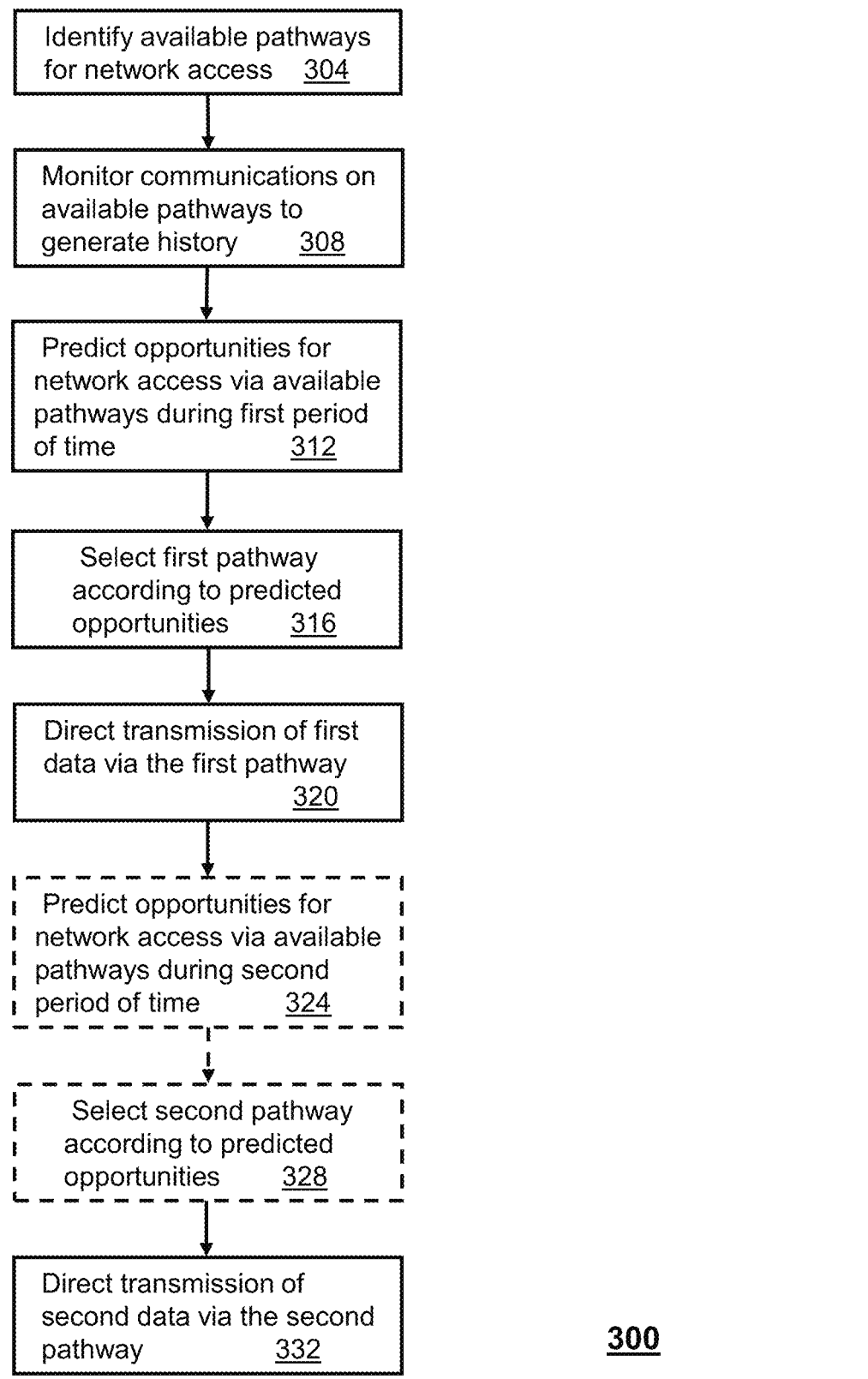
FIG. 3 depicts an illustrative embodiment of a method used in portions of the system described in FIGS. 1-2.

FIG. 3 depicts an illustrative embodiment of a method used by the system described in FIGS. 1-2. In one or more embodiments, the method provides for distribution of content for synchronous release at multiple devices. At step 304, a content server 130 can identify available pathways for network access for a device 116. As the device 116 moves from a first location to other locations, the content server 130 can identify additional pathways for network access. At step 308, the content server 130 can monitor the available pathways 180A-F that have been identified and collect historical data, including timing information regarding when the device 116 is connected, or located such that it may be potentially connected, to various pathways 180A-F over time. This historical data can include location information, timing information, device capability information, network access capability information, and/or movement information for the device 116 to build a historical "transit vector" for the device 116, which can provide a historical picture of when and where the device 116 is typically present and is typically available and capable of downloading content from the content server 130 via one or more network access pathways.

At step 312, the content server 130 can use historical information regarding the transit vector of the device 116 to predict future opportunities for network access via the available pathways 180A-F. The mobile communication device 116 can potentially download content via any of these available pathways. However, each pathway has its own set of characteristics that can include speed, costs for the user, effects on performance and/or bandwidth of one or more parts of the network 100 and other devices in the network, efficiency of resource usage, effects on the performance and/or availability of the mobile communications device 116, and so forth. Similarly, the network data path that is used for providing data via the gateway device 104B may be under stress for some reason, and the additional burden of having devices 116 may create bottle necks and system performance problems for all or part of the network 100. Accordingly, the content server 130 can use this information to engage in a "smart selection" process for selecting one or more of the available network access pathways 180A-F for use in preloading data.

At step 316, the content server 130 can evaluate the available network access pathways 180A-F for distributing the content to the device 116 by evaluating the historical transit vector data in light of preloading policies 164 and can thereby select a pathway or multiple pathways for preloading the content prior to the release time. At step 320, the content server 130 can direct transmission of the content data via the selected pathway.

At optional step 324, the content server 130 can predict opportunities for network access via available pathways during a second period of time that is at or just before the planned release time for the content. At optional step 328, the content server 130 can determine how to download the release data that is used for activating or ending the embargo of the content data that is preloaded into devices 116. In one embodiment, the content server 130 can embargo the content data from use at the device by requiring that the release data be available to the device 116 for use in unlocking access to the content data. At step 332, the content server 130 can direct transmission of the release data via the selected pathway.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
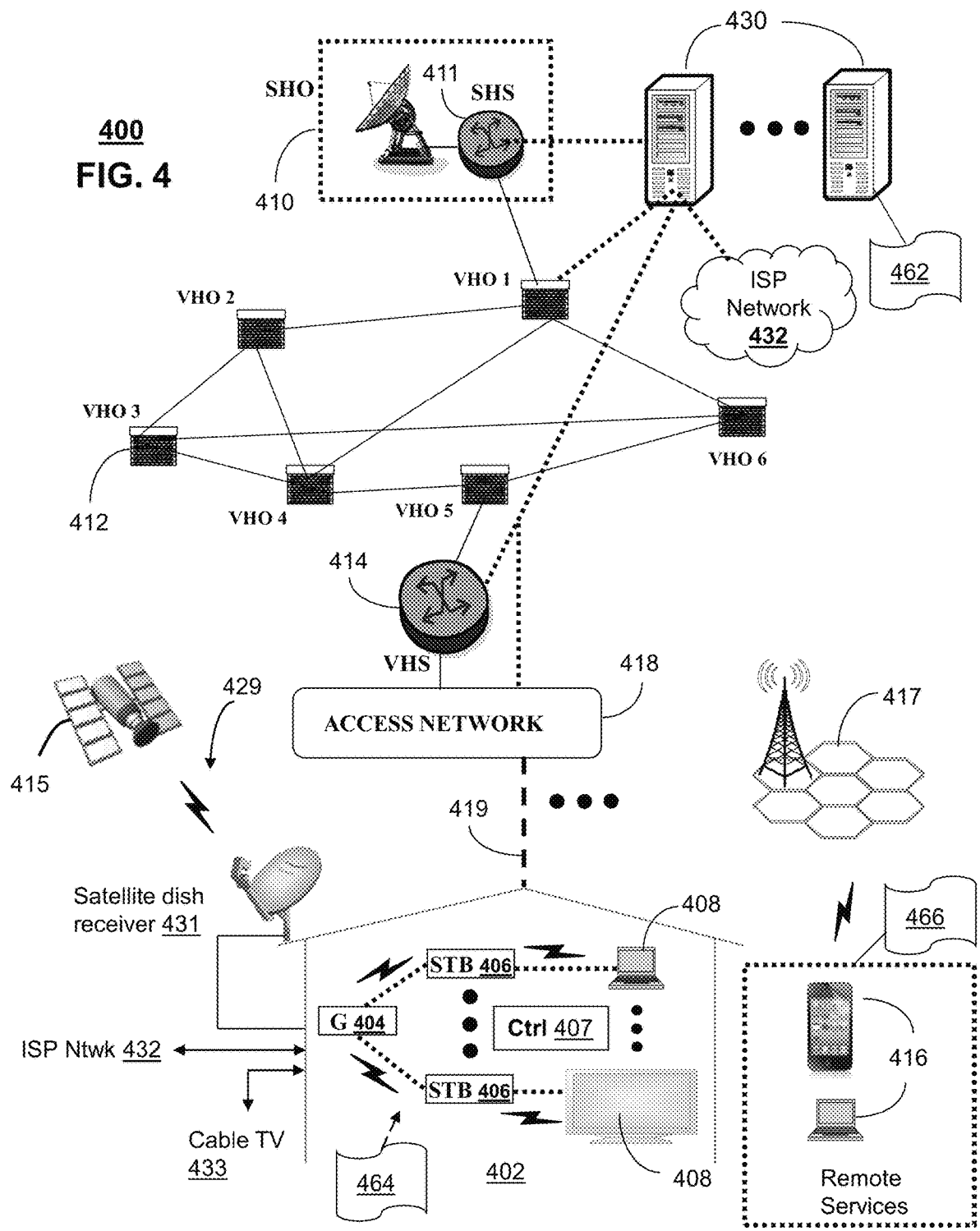
FIGS. 4-5 depict illustrative embodiments of communication systems that provide media services for use by the embargoed content system of FIGS. 1-2.

FIG. 4 depicts an illustrative embodiment of a first communication system 400 for delivering media content. The communication system 400 can represent an Internet Protocol Television (IPTV) media system. Communication system 400 can be overlaid or operably coupled with system 100-200 of FIGS. 1-2 as another representative embodiment of communication system 400. For instance, one or more devices illustrated in the communication system 400 of FIG. 4, for monitoring access points that are available to a device in advance of content release and then selecting a network access point and time for download. The content can then be preloaded into the device before it is needed. Release data can also be loaded into the device to regulate access to the content by the device, where the release data can be used embargo the preloaded content from access and use by the device until the release time and/or to enable use of the preloaded content by the device at the planned time of release.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416. Communication system 400 can also provide for all or a portion of the computing devices 430 to function as a content server (herein referred to as server 430). The server 430 can use computing and communication technology to perform function 462, which can include among other things, the techniques described by method 300 of FIG. 3. For instance, function 462 of server 430 can be similar to the functions described for content server 130 of FIG. 1 in accordance with method 300. The media processors 406 and wireless communication devices 416 can be provisioned with software functions 464 and 466, respectively, to utilize the services of server 430. For instance, functions 464 and 466 of media processors 406 and wireless communication devices 416 can be similar to the functions described for the media processor 106 and the mobile communication device 116 of FIG. 1 in accordance with method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
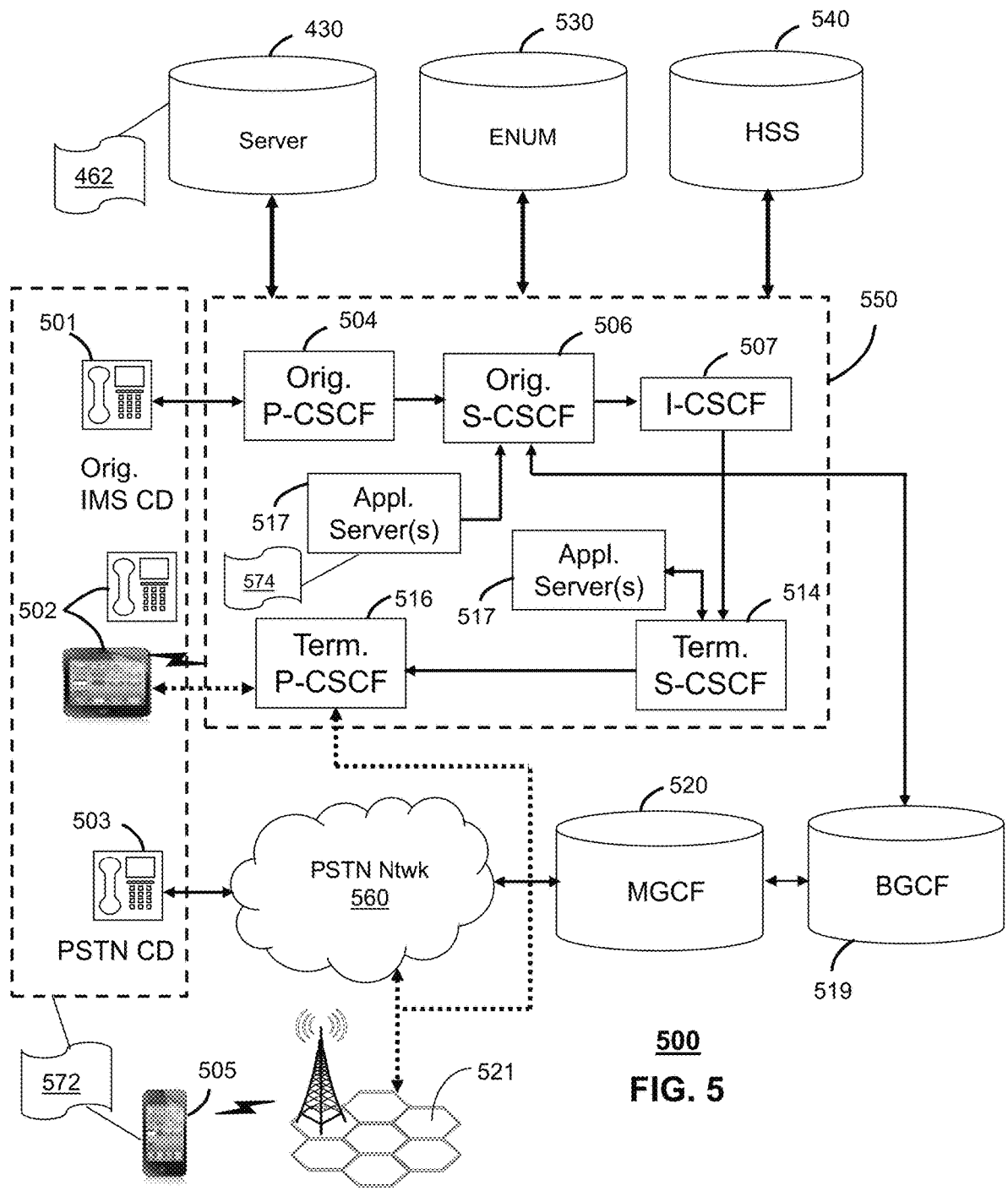

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100-200 of FIGS. 1-2 and communication system 400 as another representative embodiment of communication system 400, for monitoring access points that are available to a device in advance of content release and then selecting a network access point and time for download. The content can then be preloaded into the device before it is needed. Release data can also be loaded into the device to regulate access to the content by the device, where the release data can be used embargo the preloaded content from access and use by the device until the release time and/or to enable use of the preloaded content by the device at the planned time of release.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 430 of FIG. 4 can be operably coupled to communication system 500 for purposes similar to those described above. Server 430 can perform function 462 and thereby provide content distribution services to the CDs 501, 502, 503 and 505 of FIG. 5 similar to the functions described for content server 130 of FIG. 1 in accordance with method 300 of FIG. 1. CDs 501, 502, 503 and 505, which can be adapted with software to perform function 572 to utilize the services of the server 430 similar to the functions described for computer device 116B and mobile communication device 116 of FIG. 1 in accordance with method 300 of FIG. 3. Server 430 can be an integral part of the application server 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
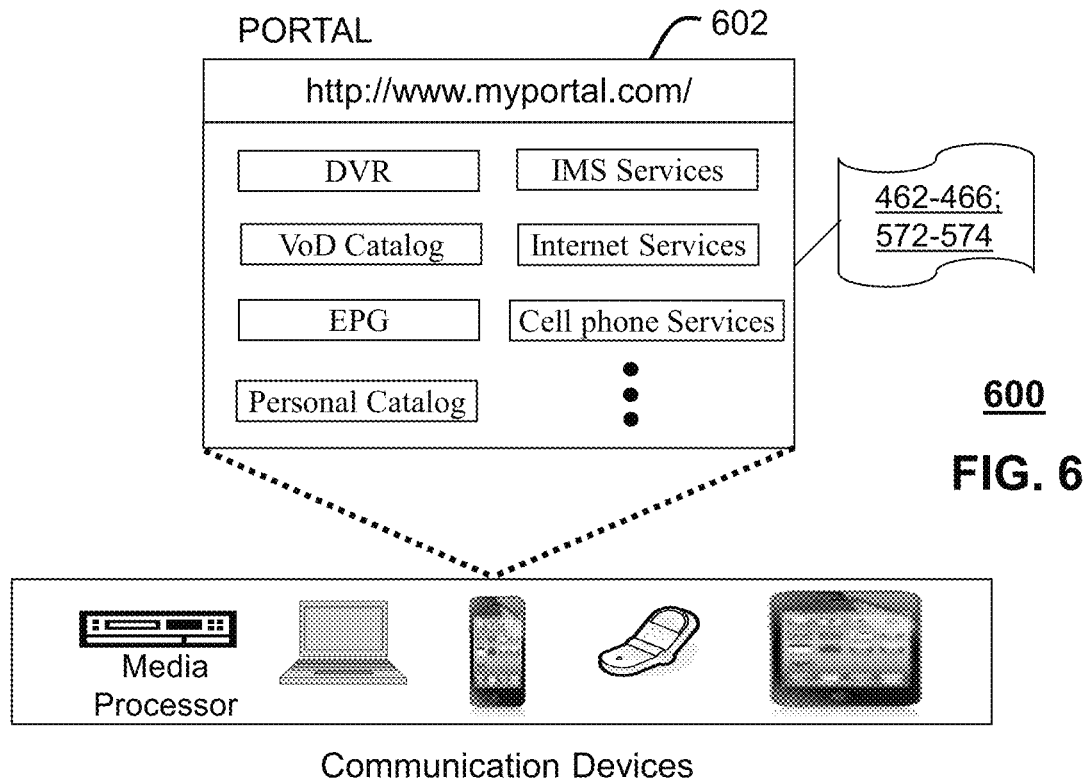
FIG. 6 depicts an illustrative embodiment of a web portal for interacting with the communication systems of FIGS. 1-2, and 4-5.

FIG. 6 depicts an illustrative embodiment of a web portal 602 of a communication system 600. Communication system 600 can be overlaid or operably coupled with systems 100-200 of FIGS. 1-2, communication system 400, and/or communication system 500 as another representative embodiment of systems 100-200 of FIGS. 1-2, communication system 400, and/or communication system 500. The web portal 602 can be used for managing services of systems 100-200 of FIGS. 1-2 and communication systems 400-500. A web page of the web portal 602 can be accessed by a Uniform Resource Locator (URL) with an Internet browser using an Internet-capable communication device such as those described in FIGS. 1-2 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of systems 100-200 of FIGS. 1-2, and communication systems 400-500. For instance, users of the services provided by content server 130 or server 430 can log into their on-line accounts and provision the content server 130 or server 430 with user profiles and/or contact information to enable it to communication with devices described in FIGS. 1-5, and so on. Service providers can log onto an administrator account to provision, monitor and/or maintain the systems 100-200 of FIGS. 1-2 or server 430.

Figure 7:
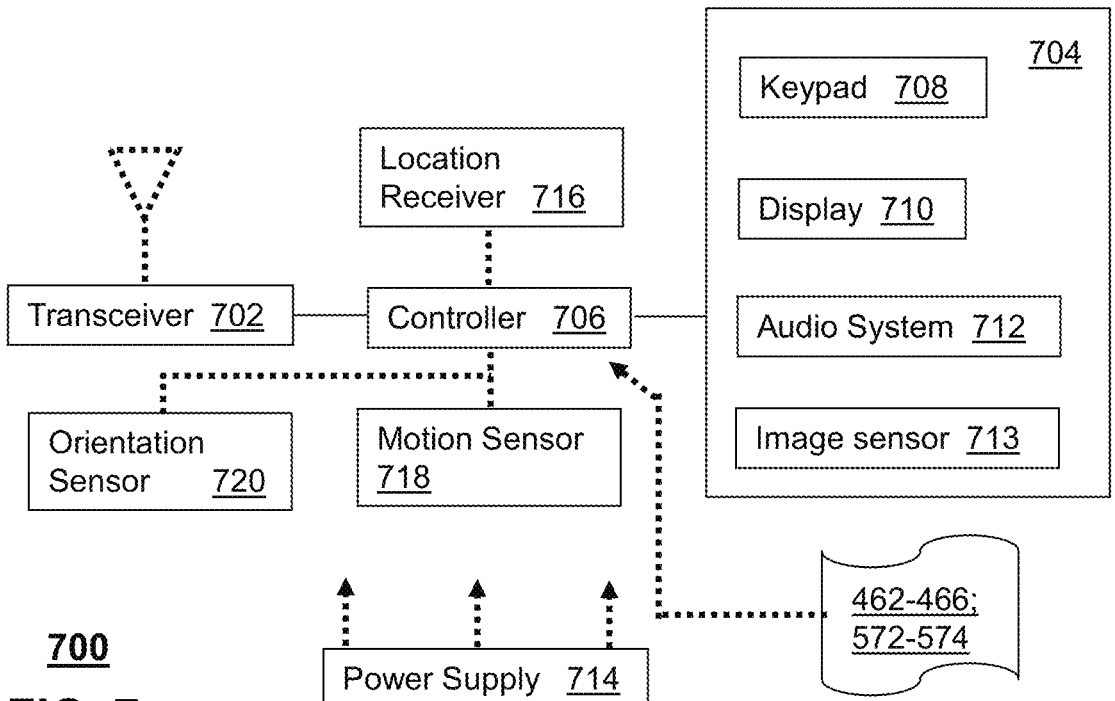
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1, 2, and 4-5, and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1 and/or 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems of FIGS. 1 and/or 2, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, content data can be preloaded into a first device but not enabled. The content data can be embargoed from use by the first device until the content data is married to a second instance or circumstance, such as an occurrence of a date or time, a movement of the device to a particular location, a completion of a user authentication at the device, an availability of a resource at the device, such as a display device for presenting content or a database. While the content remains embargoed on the device, it is safe from unauthorized usage and the device acts a digital wallet or vault. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
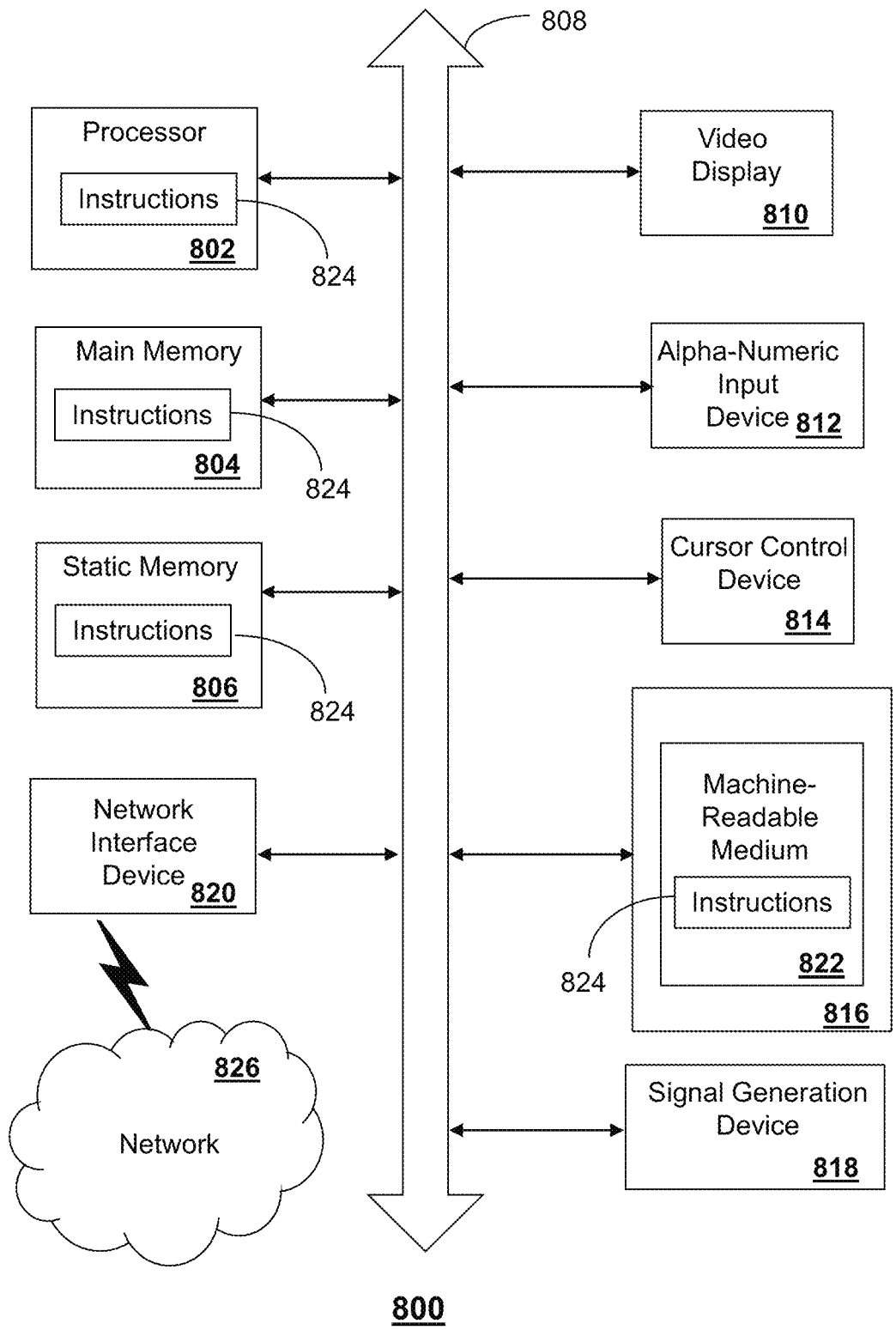
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the content server 130, the media processor 106, the mobile communication device 116, the computer device 116B, the preloading policy database 164, and other devices of FIGS. 1, 2, and 4-6. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processor, facilitate performance of operations, the operations comprising:
monitoring communications between a mobile communication device and a first network via available pathways to generate a history of network connectivity associated with the mobile communication device;
selecting a first pathway of the available pathways according to the history of network connectivity;
determining a prediction according to the history of network connectivity that the first pathway will not be available to transmit an entirety of first data to the mobile communication device, the first pathway associated with transmission of a first portion of the first data;
selecting, responsive to the prediction, an alternate first pathway of the available pathways according to the history of network connectivity, the alternate first pathway associated with transmission of a second portion of the first data; and
directing transmission of the first portion of the first data to the mobile communication device from the first network via the first pathway and the second portion of the first data to the mobile communication device from the first network via the alternate first pathway during a first time period, wherein second data is received at the mobile communication device from a second network, and wherein a presence of the second data from the second network at the mobile communication device enables an application to utilize the first data from the first network at the mobile communication device.

2. The device of claim 1, wherein the operations further comprise:

selecting a second pathway of second available pathways according to the history of network connectivity for the mobile communication device to access the second network via second available pathways during a second time period, wherein a transmission of the second data is directed to occur via the second pathway during the second time period.

3. The device of claim 2, wherein the application is unable to access the first data at the mobile communication device until the second time period.

4. The device of claim 1, wherein the operations further comprise determining quality of network access for the available pathways, wherein the first pathway is further selected according to a first quality of network access for the first pathway.

5. The device of claim 4, wherein the first quality of network access comprises a cost associated with downloading the first data from the first network to the mobile communication device via the first pathway.

6. The device of claim 4, wherein the first quality of network access comprises a resource loading associated with downloading the first data from the first network to the mobile communication device via the first pathway.

7. The device of claim 1, wherein the first data includes an embedded time hack, which prevents the application from accessing the first data until a specified time.

8. The device of claim 1, wherein the first data is transmitted via the first pathway to a server that is accessible by the mobile communication device, and wherein the selecting of the alternate first pathway is according to the history of network connectivity.

9. The device of claim 1, wherein the first data comprises media content that is presented by the application after being enabled by the second data.

10. The device of claim 1, wherein the first data comprises software data that is loaded into the mobile communication device via the application after being enabled by the second data.

11. The device of claim 1, wherein the first data is encrypted, and wherein the second data includes a decryption key.

12. The device of claim 1, wherein the transmission of the second data is associated with the presence of the mobile communication device at a location.

13. A method, comprising:
monitoring, by a processing system including a processor, communications between a mobile communication device and a first network via available pathways to generate a history of network connectivity associated with the mobile communication device;
selecting, by the processing system, a first pathway of the available pathways according to the history of network connectivity;
determining, by the processing system, a prediction according to the history of network connectivity that the first pathway will not be available to transmit an entirety of first data to the mobile communication device, the first pathway associated with transmission of a first portion of the first data;
selecting, by the processing system and responsive to the prediction, an alternate first pathway of the available pathways according to the history of network connectivity, the alternate first pathway associated with transmission of a second portion of the first data; and
directing, by the processing system, transmission of the first portion of the first data to the mobile communication device from the first network via the first pathway and the second portion of the first data to the mobile communication device from the first network via the alternate first pathway during a first time period, wherein second data is received at the mobile communication device from a second network, and wherein a presence of the second data from the second network at the mobile communication device enables an application to utilize the first data from the first network at the mobile communication device.

14. The method of claim 13, further comprising directing, by the processing system, transmission of the second data to the mobile communication device from the second network.

15. The method of claim 14, further comprising:
predicting, by the processing system, opportunities for the mobile communication device to access the second network via second available pathways during a second time period according to the history of network connectivity; and
selecting, by the processing system, a second pathway of the available pathways according to the history of network connectivity, wherein the transmission of the second data from the second network is directed to occur via the second pathway during the second time period.

16. The method of claim 13, further comprising identifying, by the processing system, the available pathways for the mobile communication device to access the first network.

17. The method of claim 13, further comprising determining, by the processing system, quality of network access for the available pathways, wherein the first pathway is further selected according to a first quality of network access for the first pathway.

18. The method of claim 13, wherein the first data is encrypted, and wherein the second data includes a decryption key.

19. A non-transitory, machine-readable storage medium, comprising executable instructions that, when executed by a processing system including a processor, facilitate performance of operations, comprising:
selecting a first pathway of available pathways during a first time period according to predicted opportunities for a mobile communication device to access a first network via the available pathways;
predicting, according to the predicted opportunities, that the first pathway will not be available to transmit an entirety of first data to the mobile communication device, the first pathway associated with transmission of a first portion of the first data;
selecting, responsive to the predicting, an alternate first pathway of the available pathways according to the predicted opportunities, the alternate first pathway associated with transmission of a second portion of the first data; and
directing transmission of the first portion of the first data to the mobile communication device from the first network via the first pathway and the second portion of the first data to the mobile communication device from the first network via the alternate first pathway during the first time period, wherein second data is received at the mobile communication device from a second network, and wherein a presence of the second data from the second network at the mobile communication device enables an application to utilized the first data from the first network at the mobile communication device.

20. The non-transitory, machine-readable storage medium of claim 19, wherein the operations further comprise monitoring communications between the mobile communication device and the first network via the available pathways to generate a history of network connectivity associated with the mobile communication device.

* * * * *